United States Patent [19]

Parsons, Jr. et al.

[11] 4,433,933
[45] Feb. 28, 1984

[54] CONNECTOR FOR FIBER REINFORCED PLASTIC TENSION RODS

[75] Inventors: James H. Parsons, Jr., Prosperity; Philippe Hardy-The McLain, Gilbert; Dominick Tringali, Columbia, all of S.C.

[73] Assignee: The Shakespeare Company, Columbia, S.C.

[21] Appl. No.: 345,058

[22] Filed: Feb. 2, 1982

[51] Int. Cl.³ ............................................. F16B 11/00
[52] U.S. Cl. .................................... 403/268; 403/368
[58] Field of Search .............. 403/268, 267, 266, 265, 403/368; 24/122.3, 115 M, 122.6, 136 R

[56] References Cited

U.S. PATENT DOCUMENTS

| 974,719 | 11/1910 | Stevenson | 403/268 |
| 1,643,110 | 9/1927 | Briggs | 403/368 |
| 3,540,763 | 11/1970 | Yee | 403/265 |
| 3,570,074 | 3/1971 | Schimmeyer et al. | 24/122.6 X |
| 4,024,013 | 5/1977 | Grable | 166/72 |
| 4,205,926 | 6/1980 | Carlson | 403/266 |

FOREIGN PATENT DOCUMENTS 681550 10/1952 United Kingdom ................ 403/267

OTHER PUBLICATIONS

D. L. Watkins & John Haarsma–Fiberglass Sucker Rods in Beam–Pumped Oil Wells, Society of Petroleum Engineers, pp. 731–732, May 1978.

*Primary Examiner*—Andrew V. Kundrat
*Attorney, Agent, or Firm*—Hamilton, Renner & Kenner

[57] ABSTRACT

A metal connector (10) for the end portion of a plastic tension rod (12) having a continuous wedge-shaped internal helical groove (18) adapted to be filled with bonding material (21) bonded to the rod (12) and non-adherent to the metal surface of the groove (18).

9 Claims, 4 Drawing Figures

CONNECTOR FOR FIBER REINFORCED PLASTIC TENSION RODS

TECHNICAL FIELD

The invention relates to metal fittings for coupling fiber reinforced plastic (FRP) tension rods end-to-end, and is particularly adapted for connecting a string of fiberglass sucker rods used in pumping an oil well.

BACKGROUND ART

For many years steel sucker rods have been used in beam-pumped wells, although such rods have certain disadvantages such as low corrosion resistance and excessive aggregate weight to lift, especially in deep wells.

Recently, fiberglass sucker rods have been tested and found to be very satisfactory. Such rods are highly corrosive resistant, have substantially higher tensile strength than steel on a strength-to-weight basis, and weigh approximately one-third as much as a steel rod of substantially the same diameter.

In order to connect the fiberglass rods end-to-end, tubular metal end fittings have been required for encasing and gripping the end portions of the rods. The inside of the fitting is sometimes provided with a longitudinal series of inclined annular grooves each concentric to the tube axis forming wedge-shaped annular voids between the inner surface of the fitting and the outer cylindrical surface of the rod. The voids are filled with a potting compound such as an epoxy resin which bonds to the rod but does not adhere to the inner surfaces of the metal tube, so that the slip of the resin wedges on the tube surface due to tensile forces on the rod produces radial compressive holding forces to grip the rod.

The main disadvantage of the foregoing concentric wedge construction is that the radial compression forces generated by each resin wedge are applied to the rod at the small end of the wedge in a single plane at right angles to its longitudinal axis. This results in displacing the outer glass fibers inwardly and placing them in a preloaded tensile condition over the underlying greater amount of internal fibers, and the resulting stacking of the inner fibers resists radial displacement thereof and aggravates the stress differential between the inner and outer fibers. Thus, the combination of compression and displacement due to high tensile loads tends to overstress the outer fibers and cause failure thereof.

DISCLOSURE OF INVENTION

The present invention provides a tubular metal connector for an FRP rod, said connector having a continuous helical inner wedge-shaped groove so that when filled with bonding material the compressive forces are not applied concentrically in the same plane to the rod under tension and the displacement of the outer fibers of the rod is not in transverse planes. Hence, the sum of the circumferential pressures at any location along the rod under the wedge are more uniform than with concentric wedges because the highs and lows do not occur in single planes. On the contrary, radial pressure varies around the rod in any transverse plane depending upon the helical wedge location at any given point around its circumference.

It is an object of the present invention to provide an improved FRP tension rod connector having wedge means to grip the rod under tension in a helical path.

Another object is to provide an improved metal connector which continuously distributes compressive gripping forces along the outer surface of the FRP rod under tension enclosed within the connector.

A further object is to provide an improved connector having wedge-shaped means inclined at an angle designed to produce distributed radial compressive forces to the FRP rod without causing shear failure at the bond.

A still further object is to provide an improved connector having wedge-shaped means graduated in size at one end of the connector to make the transition in stress from the rod to the connector more gradual.

These and other objects are accomplished by the improvements comprising the present invention, a preferred embodiment of which is disclosed and described herein as exemplifying the best known mode of carrying out the invention. Various modifications and changes in details of construction are comprehended within the appended claims.

PREFERRED EMBODIMENT OF CARRYING OUT THE INVENTION

Figure 1:
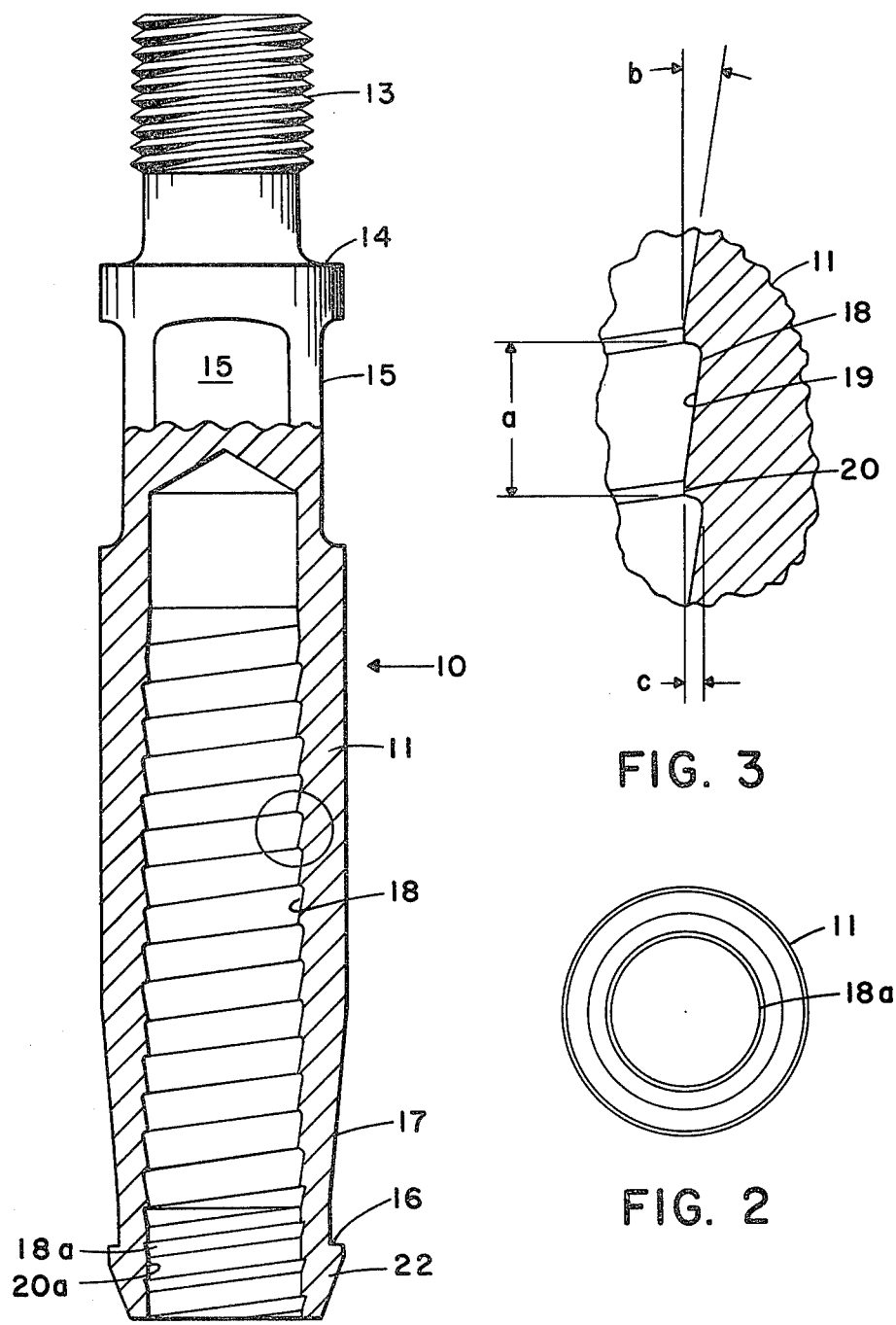
FIG. 1 is a longitudinal section of the improved metal connector fitting.
Figure 3:
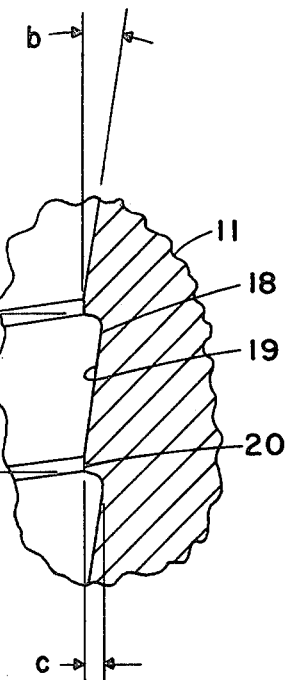
FIG. 3 is an enlargement of the portion circled in FIG. 1.
Figure 2:
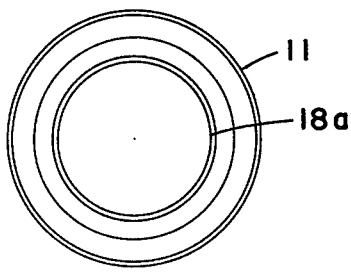
FIG. 2 is an end view of the open end thereof.

The term fiber reinforced plastic (FRP) applies to a fiber reinforced synthetic resin such as resin-bonded fiberglass which has higher tensile strength than steel on a strength-to-weight ratio. While the preferred embodiment of the invention disclosed and described herein is adapted to connect sucker rods end-to-end used in pumping oil wells, it is also adapted for other uses such as electrical utility strain rods and guy rods.

The improved connector fitting indicated generally at 10 in the drawings is formed from metal of high tensile strength such as steel having 85,000 to 115,000 PSI. The body 11 of the connector is tubular with one end open to receive the end portion of an FRP cylindrical rod 12, and the other end closed. The closed end is provided with a threaded portion 13 adapted to be screwed into a conventional rod coupling (not shown) which connects to the threaded end of a like connector on the end portion of a like rod 12.

An annular shoulder 14 is preferably provided on the connector 10 adjacent to the threaded portion 12 and exterior flat surfaces 15 are formed in the body 11 of the connector adjacent to the shoulder 14 for being engaged by a wrench when connecting to a coupling. The tubular body portion 11 of connector 10 extends from the flat surfaces 15 to the opposite open end, and an exterior annular shoulder 16 is formed on the open end by gradually tapering the outer surface inwardly as at 17, preferably at an angle of about 5°. This tapered portion allows the jaws of a fishing tool of well-known construction to engage the shoulder 16 and remove the connector with its sucker rod engaged therein from the well casing in the event of failure or breakage of the rod.

The tubular body of the connector is formed interiorly with a continuous helical wedge-shaped groove 18 having an outwardly inclined surface 19 at an angle b of about 5° to 9° to the longitudinal axis of the connector.

Preferably the inner edge of the inclined surface terminates in a flat helical band 20 for conforming to the cylindrical surface of an FRP rod 12, which may be ⅝ to 1¼ inch diameter. The axial pitch a of the helical groove 18 may vary from about ¼ inch to ½ inch which, of course, varies the radial depth c of the groove accordingly. For an axial pitch of ¼ inch the depth c is about 0.035 to 0.038 inch.

Figure 4:
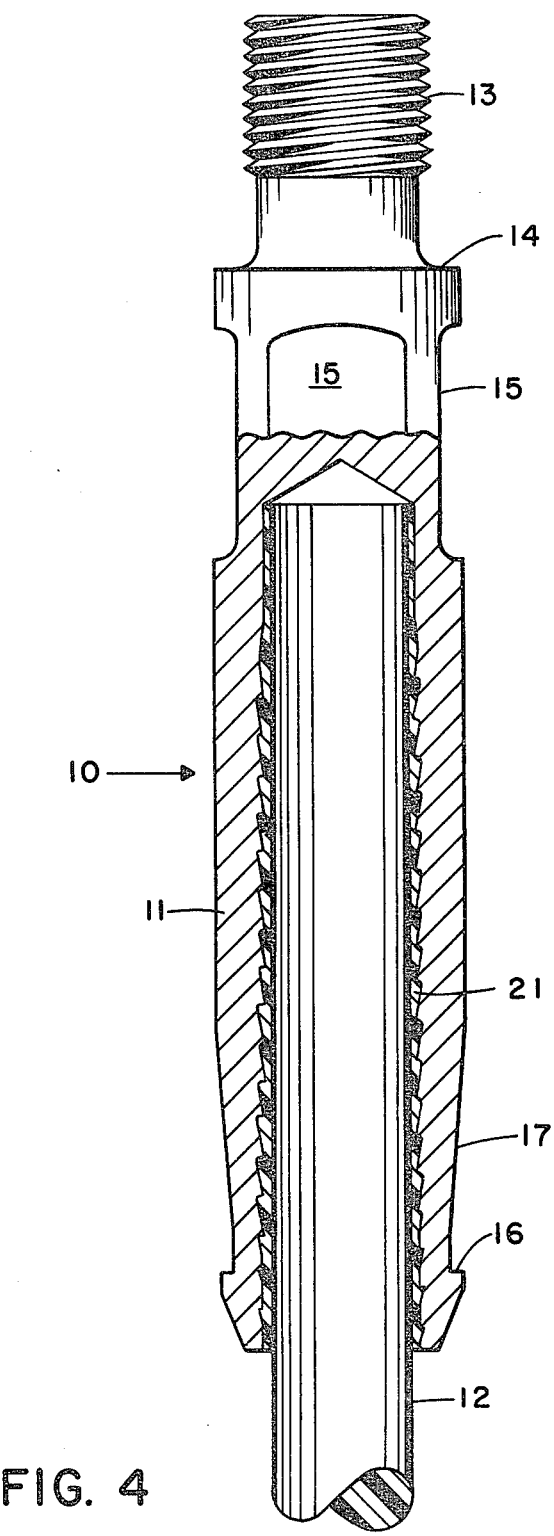
FIG. 4 is a view similar to FIG. 1 showing an FRP tension rod, bonded in the fitting by resin filling the helical groove of the fitting.

As shown in FIG. 4, when the rod 12 is inserted into the tubular body of the connector 10, the helical groove 18 is filled with a potting compound, such as epoxy resin, which forms a helical plastic wedge 21 and bonds to the surface of the FRP rod 12 but does not adhere to the metal surface of the groove 18. Preferably, the groove is treated with a release agent to insure that the helical plastic wedge will slip on the inclined surface of the groove when the rod is under tension and cause an inward compressive force to enhance the gripping action on the FRP rod.

The range of about 5° to 9° for the angle of inclination of the groove is fairly critical, as too small an angle produces a high transverse force tending to crush the rod, and too large an angle tends to cause a shear bond failure between the rod and the potting compound.

Preferably, the interior open end portion 22 of the bore of the body 11 is relieved or enlarged very slightly by axial boring which increases the width of the helical band 20a and decreases the depth of the helical groove 18a in that area. The purpose of this relieved portion is to reduce the amount of inward compressive force applied by the plastic wedge to the rod in that area and provide a more gradual transition in the stress applied to the rod entering the connector. Failure of the rod due to excessive compressive force usually occurs in that area.

Fiberglass rods having their end portions secured in steel connector fittings according to the present invention have been tested in tension to failure at 66,000 PSI.

The present improved connector fitting having a continuous helical wedge to impart compressive gripping forces to an FRP tension rod avoids maximum displacement of the outer fibers of the rod in transverse planes and distributes the forces in a helical pattern so that radial pressure around in any transverse plane varies, depending upon the location at any given point around the circumference. The sum of the circumferential pressures along the rod are more uniform as the highs and lows do not occur in common transverse planes.

We claim:

1. A metal connector for the end portion of an FRP rod subjected to longitudinal tension, comprising a tubular body for encasing the rod and having a threaded end portion adapted to be coupled to a like connector, said body having a continuous wedge-shaped internal helical groove having a surface inclined radially at an angle toward the longitudinal axis of the body, the inner edge of said groove adapted to conform to the outer surface of said rod, and said groove adapted to be filled with bonding material that bonds to the rod but does not adhere to said groove.

2. A metal connector as described in claim 1, wherein the axial pitch said groove is between about ¼ inch and about ½ inch.

3. A metal connector as described in claim 2, wherein the inclined surface of the groove is inclined at an angle of between about 5° and about 9° to the longitudinal axis of the body.

4. A metal connector as described in claim 3, wherein the inner edge of said groove terminates in a flat helical band for conforming to the outer surface of the rod.

5. A metal connector as described in claim 1, wherein the inclined surface of the groove is inclined at an angle of between about 5° and about 9° to the longitudinal axis of the body.

6. A metal connector as described in claim 5, wherein the inner edge of said groove terminates in a flat helical band for conforming to the outer surface of the rod.

7. A metal connector as described in claim 1, wherein the depth of the helical groove is relatively shallow at the opposite end portion of the body.

8. A metal connector as described in claim 7, wherein the axial pitch of said groove is between about ¼ inch and about ½ inch.

9. A metal connector as described in claim 8, wherein the inclined surface of said groove is inclined at an angle of between about 5° and about 9° to the longitudinal axis of the body.

* * * * *